(12) United States Patent
Song et al.

(10) Patent No.: US 8,750,641 B2
(45) Date of Patent: Jun. 10, 2014

(54) APPARATUS AND METHOD FOR CORRECTING DISTORTION OF IMAGE

(75) Inventors: Moon Kyu Song, Seoul (KR); Hyun Woong Cho, Gwangju (KR); Byoung Kwang Kim, Gyeongnam (KR); Woo Jin Song, Gyeongbuk (KR)

(73) Assignee: Postech Academy—Industry Foundation, Gyeongbuk (KR)

( * ) Notice: Subject to any disclaimer, the term of this patent is extended or adjusted under 35 U.S.C. 154(b) by 434 days.

(21) Appl. No.: 13/249,097

(22) Filed: Sep. 29, 2011

(65) Prior Publication Data

US 2012/0170865 A1   Jul. 5, 2012

(30) Foreign Application Priority Data

Dec. 30, 2010   (KR) .................. 10-2010-0138779

(51) Int. Cl.
*G06K 9/40* (2006.01)
*G06K 9/36* (2006.01)
*G06K 9/20* (2006.01)
*H04N 5/76* (2006.01)

(52) U.S. Cl.
USPC .................. 382/275; 382/282; 348/231.6

(58) Field of Classification Search
USPC .......................................................... 382/275
See application file for complete search history.

(56) References Cited

U.S. PATENT DOCUMENTS

| 5,878,174 | A | 3/1999 | Stewart et al. | |
| 8,289,420 | B2 * | 10/2012 | Yoda | 348/240.2 |
| 2006/0140503 | A1 * | 6/2006 | Kurata et al. | 382/275 |
| 2008/0205758 | A1 | 8/2008 | Zandifar et al. | |
| 2009/0059041 | A1 | 3/2009 | Kwon | |
| 2009/0136137 | A1 * | 5/2009 | Kozakaya | 382/195 |
| 2011/0134254 | A1 * | 6/2011 | Hulsken et al. | 348/187 |

FOREIGN PATENT DOCUMENTS

| JP | 2011217311 A | * 10/2011 |
| WO | 2007007924 A1 | 1/2007 |

OTHER PUBLICATIONS

Song, Moon-Kyu, Kim, Byoung-Kwang, Song, Woo-Jin, "An Accurate Radial Lens Distortion Center Estimation", Proceeding of the 2010 Korea Signal Processing Conference, Oct. 2, 2010, 7 pages.

* cited by examiner

*Primary Examiner* — Michelle Entezari
(74) *Attorney, Agent, or Firm* — Osha Liang LLP

(57) ABSTRACT

Provided are an apparatus and method for correcting distortion of an image. The method includes finding center point vectors including lens distortion center information about an image and dividing the image into at least two blocks on the basis of the center point vectors, and determining representative directions of the at least two divided blocks and removing outlier vectors not indicating the representative directions from the blocks to estimate a lens distortion center. Accordingly, accurate image correction is enabled by estimating distortion centers of images generated by devices equipped with any lens. Also, image content improving lens distortion correction performance is differentiated from image content degrading the same by picking out image content improving lens distortion center estimation performance, so that a superior image correction effect to other image correction techniques can be obtained.

13 Claims, 8 Drawing Sheets

FIG. 2
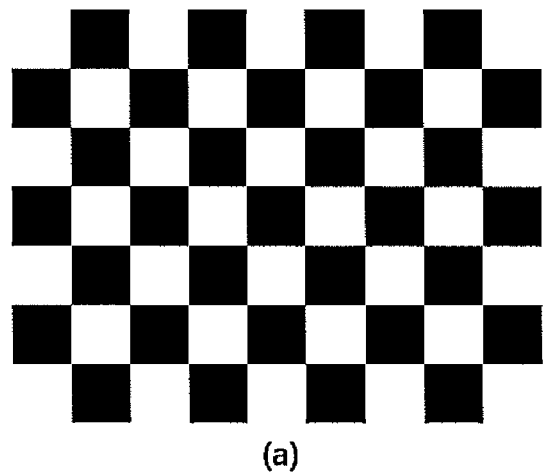
(a)
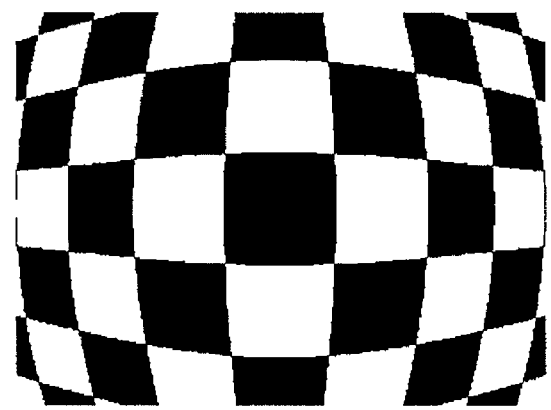
(b)
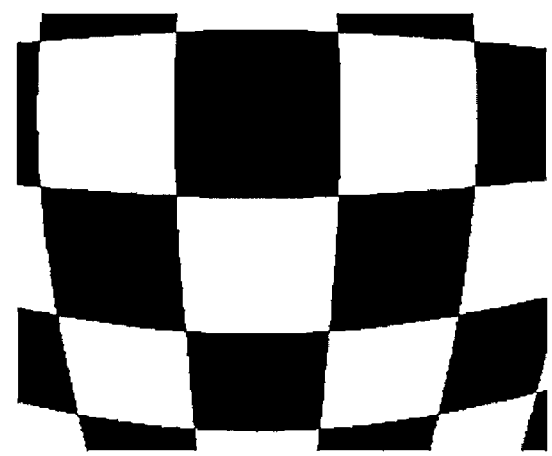
(c)

(a)           (b)

(a)           (b)

APPARATUS AND METHOD FOR CORRECTING DISTORTION OF IMAGE

CLAIM FOR PRIORITY

This application claims priority to Korean Patent Application No. 10-2010-0138779 filed on Dec. 30, 2010 in the Korean Intellectual Property Office (KIPO), the entire contents of which are hereby incorporated by reference.

BACKGROUND OF INVENTION

1. Technical Field

Example embodiments of the present invention relate in general to an apparatus and method for correcting distortion of an image, and more specifically, to a method of correcting distortion that has occurred in an image and an apparatus using the method.

2. Related Art

With the development of high-capacity memory chips and the drastic increase in computer processing speed, computer-based image processing technology is being widely used in general industries. In particular, the technology is becoming essential component technology for examination and measurement in factory automation lines, web-based real-time monitoring systems, etc. When a wide-angle lens such as a fisheye lens is used, an image of a large area can be obtained in the same field of view (FOV). However, as the distance from the center of an image increases, distortion becomes severe, and thus geometric correction is needed.

In connection with correction of an input image, many researchers have reported distorted image correction technology for cameras, video cassette recorders (VCRs), etc. To correct distortion caused by a wide-angle lens, Rahul has researched a camera correction method for correcting both of radial distortion and decentering distortion. Weng has researched an algorithm for correcting an image input from a camera. Tsai has reported a first fast Fourier transform (FFT)-based correction formula, and corrected an image center point using a rigid body transformation, a distance equation for a pinhole camera, and a radial distortion formula expressed by a second-order term.

Most researchers have used a general formula of a correction model for distortion occurring in a diagonal direction, etc. of a camera whose wide angle is not large, etc., and performed correction by calculating respective coefficients using a minimizing method. Also, due to complexity of a general formula for a correction model, most researchers have ignored high-order terms and applied the correction model only to a specific distortion type in a specific vision environment.

Aberration is an important factor that determines performance of an optical system. Aberration is caused by a characteristic of a lens of a uniform curvature and refractive index, denoting a phenomenon in which an image is not normally formed and thus looks blurred or distorted.

In general, lens aberrations are classified into five types: spherical aberration, coma, astigmatism, curvature of field, and distortion, which are referred to as the Seidel aberrations.

Spherical aberration denotes a phenomenon in which a ray incident from a position far from a vertical axis passing through the center of a lens, that is, an on-axis, is refracted more than a ray incident from a position close to the on-axis, and forms an image at a position close to the lens.

Astigmatism is caused by poor grinding of a lens, a faulty lens material, temperature difference, etc.

Curvature of field denotes a phenomenon in which a ray incident from a position far from an on-axis of a lens forms an image at a position close to the lens, and thus the focus is not on a plane but on a spherical surface, resulting in a curved image.

Distortion denotes a phenomenon in which a straight line of a subject forms a curved image.

Color aberration denotes a phenomenon in which a subject appears to spread according to colors. When light passes through a lens, rays of the light are refracted according to their wavelengths. Thus, rays having relatively short wavelengths are more refracted than others, that is, rays having different wavelengths differently form an image.

Radial distortion frequently occurs in a camera equipped with a cheap lens, particularly, a fisheye lens or tilt lens. Such lens distortion occurs in all image apparatuses using a lens. When a center point of such lens distortion is not found, it is impossible to correct the lens distortion, or new distortion occurs even after the distortion is corrected. The problem of image distortion is very important for digital imaging system manufacturers and core component providers.

To reduce lens distortion, a special material may be used for a lens, or several lenses may be attached to each other. However, the former method causes an increase in the price of a lens, and thus cannot be applied to a small camera whose lens cannot be changed. Also, when several lenses are used, a distortion center is warped.

Due to these problems, many methods for correcting such distortion by image processing are under development. Thus far, distortion correction technology has mainly used a camera setting for photographing or an image of a specific test pattern. Such distortion correction technology is being gradually succeeded by research on an automatic correction method of correcting lens distortion using only image information without additional information.

Most conventional methods concentrate on a technique for correcting radial lens distortion that is easy to analyze and correct. In particular, research on lens distortion correction techniques based on image processing techniques has been carried out to correct lens distortion of a small camera. Mainly, research has been conducted on techniques for correcting radial lens distortion by finding the degree of distortion on the basis of a center point of the distortion. Optimization is performed to solve a set of all equations describing a set of curves and aberration between a set of straight lines and the set of curves, thereby calculating the overall degree of distortion from a distorted image to a corrected image.

SUMMARY OF INVENTION

Accordingly, example embodiments of the present invention are provided to substantially obviate one or more problems due to limitations and disadvantages of the related art.

Most correction techniques have a problem in that lens distortion correction performance notably varies according to whether the center point of radial lens distortion is accurately estimated.

Also, many correction techniques assume that the center of lens distortion coincides with the center of an image. Since radial lens distortion is determined with respect to the distortion center, correction is impossible or additional distortion occurs when this assumption is not true. Currently, with the development of camera technology and users' image processing technology, various special lenses and photographing techniques are in use, and image processing such as trimming of an image after photographing is frequently being performed. In a trimmed image, the center of lens distortion may not coincide with the center of the image, and thus image correction performance is degraded.

Thus, example embodiments of the present invention provide a method of correcting distortion of an image by estimating the distortion center of a lens.

Example embodiments of the present invention also provide an apparatus for implementing the method of correcting distortion of an image by estimating the distortion center of a lens.

In some example embodiments, a method of correcting distortion of an image includes: finding center point vectors including lens distortion center information about the image, and dividing the image into at least two blocks on the basis of the center point vectors; and determining representative directions of the at least two divided blocks and removing outlier vectors not indicating the representative directions from the blocks to estimate a lens distortion center. Finding the center point vectors and dividing the image into the at least two blocks on the basis of the center point vectors may include: extracting the center point vectors having points included in arcs of curves included in the image as start points of the center point vectors and points included in chords of the curves as end points of the center point vectors; and dividing the image so that the numbers of center point vectors in the respective blocks become the same or have a difference of 1. Extracting the center point vectors having the points included in the arcs of the curves included in the image as the start points of the center point vectors and the points included in the chords of the curves as the end points of the center point vectors may include determining the center points of the arcs as the start points of the center point vectors and points at which lines extending from the center points of the arcs cross the chords of the curves at right angles as the end points of the center point vectors. Finding the center point vectors and dividing the image into the at least two blocks on the basis of the center point vectors may include stopping division of the image when one of the blocks obtained by dividing the image has a different representative direction than the other blocks. Determining the representative directions of the at least two divided blocks and removing the outlier vectors not indicating the representative directions from the blocks to estimate the lens distortion center may include: detecting a candidate region having the lens distortion center; and estimating the lens distortion center on the basis of the candidate region having the lens distortion center. Detecting the candidate region having the lens distortion center may include quantizing the center point vectors except for the outlier vectors, and detecting a region in which the largest number of regions indicated by the quantized center point vectors overlap as the candidate region having the lens distortion center. Estimating the lens distortion center on the basis of the candidate region having the lens distortion center may include dividing the candidate region into quarters, selecting one region among divided the candidate region using the center points of the respective divided the candidate region by checking errors after distortion is corrected, and estimating the lens distortion center by performing to divide the one region into quarters until a size of divided the one region becomes predetermined size.

In other example embodiments, an apparatus for correcting distortion of an image includes: an image input unit to which the image is input; and an image correction unit configured to receive the image input from the image input unit, find center point vectors including lens distortion center information about the image, divide the image into at least two blocks on the basis of the center point vectors, determine representative directions of the at least two divided blocks, and remove outlier vectors not indicating the representative directions from the blocks to estimate a lens distortion center. The image correction unit may include: an image divider configured to find the center point vectors on the basis of the image provided by the image input unit, and divide the image on the basis of the center point vectors; an outlier vector remover configured to remove the outlier vectors not indicating the representative directions based on the center point vectors of the divided image provided by the image divider; a lens distortion center candidate region estimator configured to detect a lens distortion center candidate region on the basis of center point vectors included in the blocks provided by the outlier vector remover; and a lens distortion center estimator configured to estimate the lens distortion center included in the lens distortion center candidate region provided by the lens distortion center candidate region estimator. The image divider may extract the center point vectors having points included in arcs of curves included in the image as start points of the center point vectors and points included in chords of the curves as end points of the center point vectors, and divide the image so that the numbers of center point vectors in the respective blocks become the same or have a difference of 1. The image divider may determine the center points of the arcs as the start points of the center point vectors and points at which lines extending from the center points of the arcs cross the chords of the curves at right angles as the end points of the center point vectors. The lens distortion center candidate region estimator may quantize the center point vectors except for the outlier vectors, and estimate a region in which the largest number of regions indicated by the quantized center point vectors overlap as the candidate region having the lens distortion center. The lens distortion center estimator may estimate the center of the candidate region having the lens distortion center as the lens distortion center.

BRIEF DESCRIPTION OF DRAWINGS

Example embodiments of the present invention will become more apparent by describing in detail example embodiments of the present invention with reference to the accompanying drawings, in which:

FIG. 2 shows images before and after lens distortion has occurred according to an example embodiment of the present invention;

DETAILED DESCRIPTION

Figure 1:
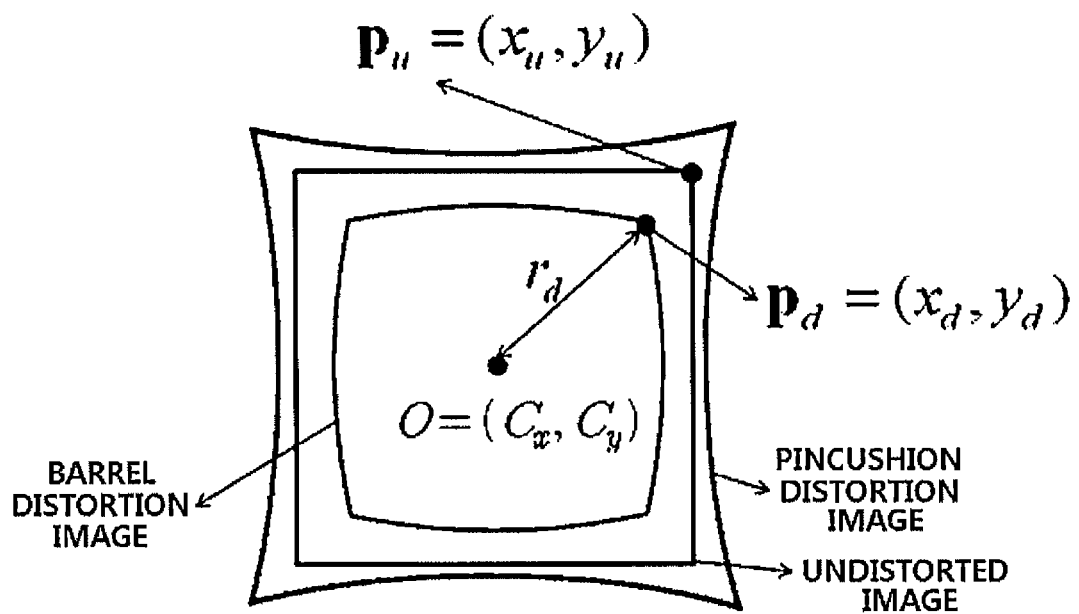
FIG. 1 is a conceptual diagram illustrating lens distortion according to an example embodiment of the present invention.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and at combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Hereinafter, example embodiments of the present invention will be described with reference to appended drawings.

An outlier vector is defined as a vector lying out of the overall tendency of data collected by experiments or observation. On the other hand, an inlier vector is defined as a vector lying within the overall tendency of data.

FIG. 1 is a conceptual diagram illustrating lens distortion according to an example embodiment of the present invention.

Referring to FIG. 1, radial lens distortion may be modeled using distance from a pixel to a lens distortion center $O=(C_x, C_y)$. Equation 1 below is a model of lens distortion obtained using distance information from a pixel to a lens distortion center.

$$x_u = x_d + x_d \sum_{i=1}^{\infty} \kappa_i r_d^{i-1}$$

$$y_u = y_d + y_d \sum_{i=1}^{\infty} \kappa_i r_d^{i-1}$$

[Equation 1]

In Equation 1 above, distance from a distorted pixel to the lens distortion center O is $r_d$, and a parameter indicating the level of lens distortion is K. Coordinates of an image in which lens distortion has not occurred may be expressed as $P_u=(x_u, y_u)$, and coordinates of an image in which lens distortion has occurred may be expressed as $P_d=(x_d, y_d)$.

Equation 2 below defines the distance $r_d$ between the distorted pixel and the lens distortion center O.

$$r_d = \sqrt{(x_d - C_x)^2 + (y_d - C_y)^2}$$

[Equation 2]

Conventional lens distortion correction techniques assume that the center of lens distortion coincides with the center of an image. However, the center of the image in which lens distortion has occurred does not coincide with the lens distortion center $(C_x, C_y)$, and thus lens distortion correction is impossible when Equation 1 is applied on the assumption that the center of lens distortion coincides with the center of an image.

In an example embodiment of the present invention, without the assumption that the center of lens distortion coincides with the center of an image, the lens distortion center is separately obtained to correct the distortion that has occurred in the image.

In Equation 3 below, the degree of distortion of an image is estimated in consideration of a value of $K_3$ among values of the parameter K indicating the level of lens distortion.

$$x_u = x_d + x_d(K_3 r_d^2)$$

$$y_u = y_d + y_d(K_3 r_d^2)$$

[Equation 3]

Since the value of $K_3$ among values of the parameter K has a great effect on the level of lens distortion, simple modeling may be performed in consideration of the parameter $K_3$ alone in Equation 1.

In an example embodiment of the present invention, distortion that has occurred in an image is corrected using the parameter $K_3$ for convenience and due to the complexity of calculation. However, a plurality of lens distortion parameters may be selectively used to correct distortion that has occurred in an image.

A method of correcting a distorted image on the basis of a lens distortion center using Equations 1 to 3 above is an example embodiment. Without departing from the spirit of the present invention, a distorted image may be corrected using a different method from the method based on a lens distortion center using Equations 1 to 3.

FIG. 2 shows images before and after lens distortion has occurred according to an example embodiment of the present invention.

FIG. 2(A) shows a general image in which distortion has not occurred, and FIG. 2(B) shows an image in which lens distortion has occurred and the center of the image coincides with the center of the lens distortion.

FIG. 2(C) shows an edited part of an image in which lens distortion has occurred and the center of the image does not coincide with the center of the lens distortion.

Figure 3:
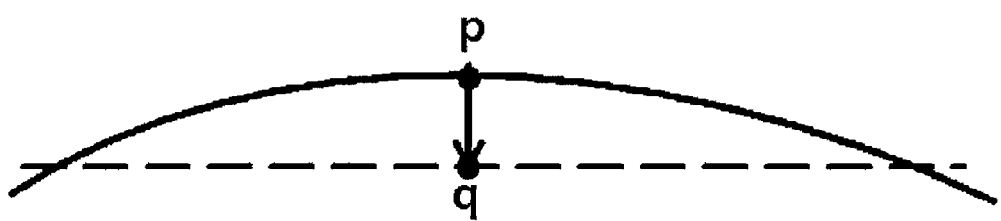
FIG. 3 illustrates a method of finding a lens distortion center estimation vector according to an example embodiment of the present invention.

FIG. 3 illustrates a method of finding a lens distortion center estimation vector according to an example embodiment of the present invention.

Referring to FIG. 3, to estimate a lens distortion center, a center point vector for estimating the lens distortion center may be obtained using a curve in an image.

As a vector used to obtain the lens distortion center, the center point vector has a point included in the curve of the image as a start point and a point included in a chord of the curve as an end point.

On the basis of the curve in the image, a straight line before distortion has occurred may be obtained. Since the straight line does not exactly coincide with a straight line converted by lens distortion modeling using Equations 1 to 3, it is not possible to accurately find the degree of distortion.

A center point vector starting from a center point p of a curve and ending at a point q where a straight line from the point p crosses a chord of the curve at right angles, indicates a direction of a lens distortion center. Center point vectors may be extracted using such a method for all curves in an image.

In an example embodiment of the present invention, a vector is used to obtain a lens distortion center for convenience, but something other than a vector may be used to indicate a lens distortion center. For example, a lens distortion center may be found using a mathematically modeled straight line rather than a vector.

When lens distortion occurs, a straight line of an original image, which is an image obtained when distortion does not occur, is distorted and results in a vector, which may provide helpful information in estimating a lens distortion center. However, when the vector is too small or a curve has not resulted from distortion of a straight line in the original image, the vector may provide incorrect information for estimating a lens distortion center.

A vector providing incorrect information for estimating a lens distortion center may be referred to as an outlier vector, and vectors may be grouped to remove such outlier vectors having incorrect information.

Various methods may be used to detect a curve included in an image, and the curve detection method is not limited to a specific method in an example embodiment of the present invention.

For example, an edge of an image may be detected, and then pixels constituting the edge may be connected to detect lines. When the detected lines are connected, curves are formed. Here, using some threshold values of the length, angle, and distance of a curve, a curve for estimating a lens distortion center of the image may be generated. Curves may also be detected using a Hough transform, etc. rather than this method.

After a curve is detected using such methods, a straight line for detecting a center point vector of the curve may be generated.

For example, when the sum of squares of vertical distance from all pixels in the curve to each straight line is calculated using a regression line, a straight line having the least sum may be found, and the found straight line may be estimated to be similar to a line before occurrence of distortion and used.

In a method of finding a center point vector on the basis of a curve and a straight line according to an example embodiment of the present invention, a center point vector may be found using a point included in an arc of a curve included in an image as the start point of the center point vector and a point included in a chord of the curve as the end point of the center point vector.

Also, among points of each arc and chord, the center point of the arc may be used as the start point of a center point vector, and a point at which a line extending from the center point of the arc crosses a chord of the curve at right angles may be used as the end point of the center point vector.

However, without departing from the spirit of the present invention, a straight line for finding a vector for detecting a lens distortion center may be found in a different method than the above-described method, and the different method is also covered by the claims of the present invention.

Figure 4:
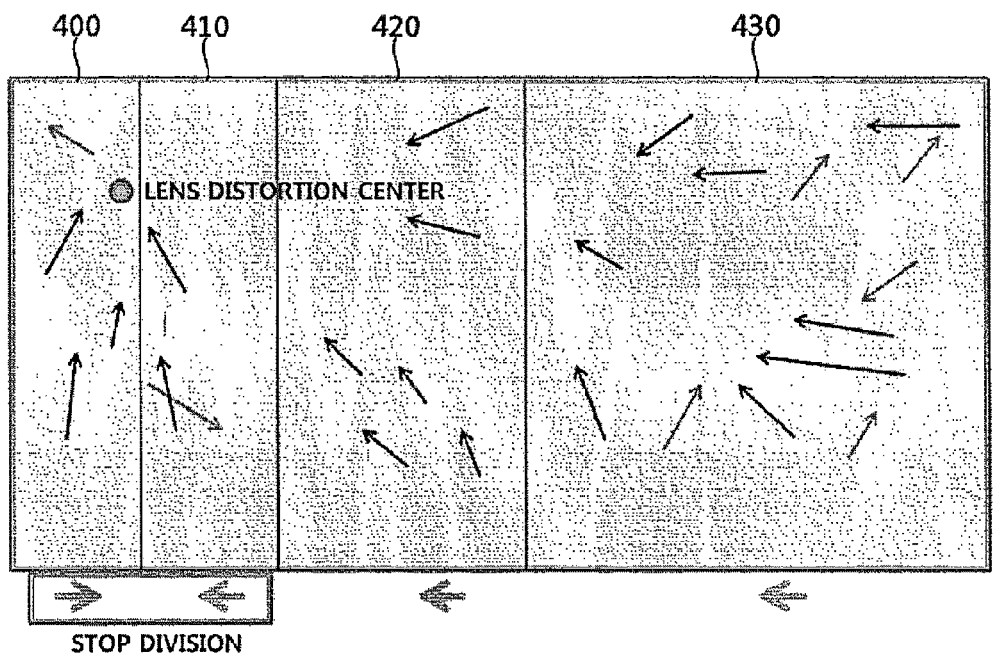
FIG. 4 is a conceptual diagram illustrating a method of grouping vectors in an image and dividing the image into blocks according to an example embodiment of the present invention.

FIG. 4 is a conceptual diagram illustrating a method of grouping vectors in an image and dividing the image into blocks according to an example embodiment of the present invention.

Extracted center point vectors may be grouped in the same way on the basis of the horizontal axis and vertical axis of an image. In an example embodiment of the present invention below, a process of grouping vectors on the basis of, for convenience, a horizontal axis and dividing an image into blocks will be described.

Referring to FIG. 4, among center point vectors in an image, center point vectors having a magnitude greater than a specific threshold value may be differentiated and counted on the basis of a horizontal axis of the image. The whole image may be divided into two blocks, and center point vectors included in each block may be grouped. Here, the two blocks may include the same number of vector start points or vector end points.

In a method of estimating a lens distortion center according to an example embodiment of the present invention, a whole image may be divided into a plurality of blocks according to the number of center point vectors. When the number of center point vectors having the same start point or end point is obtained using the method of dividing an image according to the number of center point vectors, the image may be divided into a plurality of blocks by obtaining the number of center point vectors included in each block on the basis of a part that can be a predetermined reference.

However, without departing from the spirit of the present invention in which a lens distortion center is obtained by dividing a whole image using center point vectors, a variety of variables of center point vectors, such as the degree of distribution of the center point vectors included in a whole image or the magnitudes of the center point vectors, can also be used.

A method of detecting a lens distortion center on the basis of, for convenience, the number of center point vectors will be described in an example embodiment of the present invention below, but the claims of the present invention are not limited to estimating a lens distortion center on the basis of the number of center point vectors.

In the simplest of dividing an image into blocks, an image may be divided into two blocks using a straight line. However, without departing from the spirit of the present invention, an image can be divided into blocks in another way. For example, a predetermined angle is given to a straight line, so that an image can be divided into two blocks.

In the divided blocks, the same number of start points or end points of center point vectors may be included. When the number of center point vectors is odd, the number of center point vectors in one of the two blocks may be greater than that in the other block by one. In the case of a horizontal axis, center point vectors directed to the left and those directed to the right among vectors belonging to each of the two divided blocks may be separately counted, and a direction indicated by a greater number of center point vectors may be determined as a representative direction of the block.

A process of checking the representative directions of the two divided blocks after the process of dividing the image into the blocks and determining the representative directions is finished, and when the representative directions of the two blocks are the same, designating one block disposed in the representative direction between the two blocks as a new region, dividing the block in the region into blocks, and finding representative directions of the divided blocks may be repeatedly performed.

When the representative directions differ from each other, the repetition process may be stopped, and outlier vectors providing incorrect information for estimating a lens distortion center may be removed.

In the process of removing outlier vectors, inlier vectors and outlier vectors are classified to improve lens distortion correction performance as well as lens distortion center estimation performance. Thus, a distorted image can be corrected more effectively.

As a result of the process of repeatedly dividing a block, center point vectors having a different direction from a representative direction of center point vectors included in each block do not indicate a lens distortion center. When the vectors not indicating a lens distortion center are removed, only inlier vectors indicating the lens distortion center remain.

On the basis of a vertical axis also, the above-described process of dividing the image into blocks and removing outlier vectors may be performed to leave only inlier vectors indicating the lens distortion center.

Referring to FIG. 4, vectors shown in the drawing may be included in a first block (400), a second block (410), a third block (420), and a fourth block ((430)).

The first block (400) to the fourth block ((430)) have been divided in advance for convenience and are shown in the drawing. These blocks may be divided in sequence according to the following procedure.

According to start points of center point vectors, the first block (400) includes four center point vectors, the second block (410) includes three center point vectors, the third block (420) includes six center point vectors, and the fourth block ((430)) includes 13 center point vectors.

Since the number of all the center point vectors is 26, the image may be divided into the first, second and third blocks (400), (410) and (420) and the fourth block ((430)) to have the same number, that is, 13, of center point vectors.

A representative direction of the majority of center point vectors included in the first, second and third blocks (400), (410) and (420) is left, and a representative direction of the majority of center point vectors included in the fourth block ((430)) is also left.

When representative directions of center point vectors included in respective blocks divided from an image are the same, a block disposed in the representative direction may be divided again.

For example, since the representative directions of vectors included in the first, second and third blocks (400), (410) and (420) and the fourth block ((430)) are left, a region including the first, second and third blocks (400), (410) and (420) disposed in the left direction among the blocks may be divided again.

Center point vectors included in the first, second and third blocks (400), (410) and (420) are 13, and may be divided into seven center point vectors and six center point vectors, so that the first and second blocks (400) and (410) include the seven center point vectors, and the third block (420) includes the six center point vectors.

A representative direction indicated by the majority of the seven center point vectors included in the first and second blocks (400) and (410) is left, and that indicated by the majority of the six center point vectors included in the third block (420) is also left. Thus, the first and second blocks (400) and (410) disposed in the left direction may be divided again in the same way.

The first and second blocks (400) and (410) include the seven blocks, and thus may be divided into the first block (400) including four center point vectors and the second block (410) including three center point vectors.

A representative direction indicated by the majority of the center point vectors included in the first block (400) is right, and that indicated by the majority of the center point vectors included in the second block (410) is left. Since directions indicated by center point vectors of the first and second blocks (400) and (410) differ from each other, division of the image may be stopped, and outlier vectors that are center point vectors providing incorrect information for estimating a lens distortion center may be removed.

A center point vector indicating the left direction may be removed from the first block (400), and center point vectors indicating the right direction may be removed from the second, third and fourth blocks (410), (420) and (430).

In the process of removing outlier vectors, inlier vectors and outlier vectors are classified to improve lens distortion correction performance as well as lens distortion center estimation performance. Thus, a distorted image can be corrected more effectively.

As a result of the process of repeatedly dividing a block, center point vectors having a different direction from a representative direction of center point vectors included in each block do not indicate a lens distortion center. When the vectors not indicating a lens distortion center are removed, only inlier vectors indicating the lens distortion center remain.

The above-described method is merely one example for dividing an image, and an image may be divided all at once rather than sequentially.

An image is divided into an even number of blocks on the basis of the number of all center point vectors. When the number of all center point vectors is 26, an image may be divided on the basis of the number of cases such as 13/13, 13/6/7 and 13/6/4/3. Using such a method, the image may be divided all at once, and it may be determined whether there is a block having a representative direction different from other blocks in the divided image to remove outlier vectors when there is a block having a representative direction different from other blocks.

Figure 5:
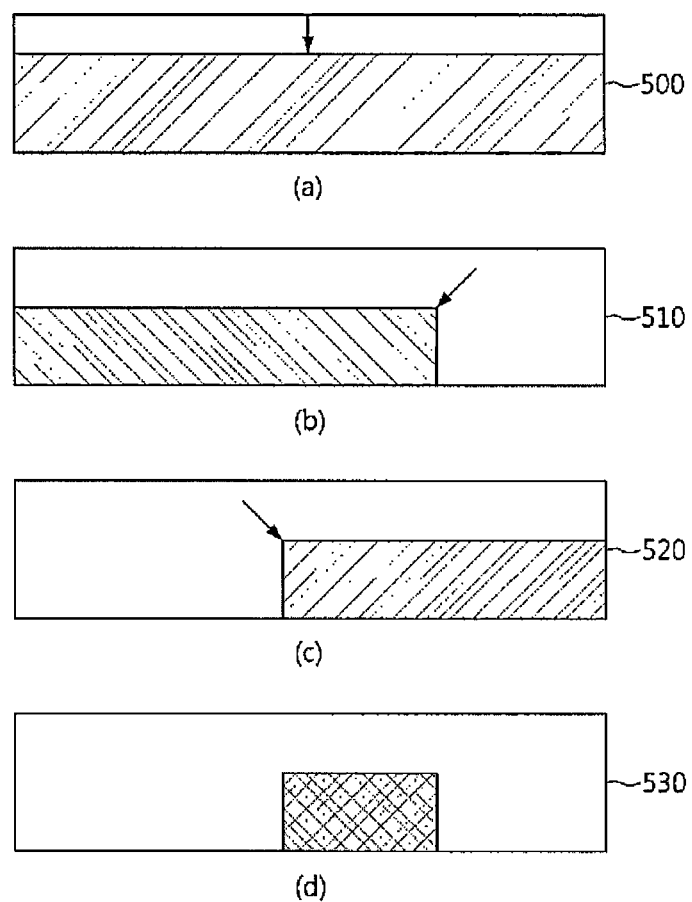
FIG. 5 is a conceptual diagram illustrating a method of quantizing inlier vectors to estimate a lens distortion center according to an example embodiment of the present invention.

FIG. 5 is a conceptual diagram illustrating a method of quantizing inlier vectors to estimate a lens distortion center according to an example embodiment of the present invention.

A quantization process of quantizing center point vectors is performed to reduce the complexity of calculation, but is not an essential process.

Referring to FIG. 5, a candidate region in which a lens distortion center may be included can be detected by quantizing directions indicated by inlier vectors.

In a method of finding a lens distortion center in a candidate region detected on the basis of all inlier vectors, coordinates of a point causing the least error when curves formed by the inlier vectors are linearized may be found.

The method of detecting a candidate region including lens distortion may be repeatedly performed with the size of a candidate region continuously reduced, so that the complexity of calculation can be reduced to be lower than that of a method of detecting a lens distortion center in all coordinates in the candidate region.

For example, center point vectors may be quantized in eight directions. When a center point vector indicating the top of an image has an angle of 0 degrees, all the center point vectors may be quantized as those having the eight directions, that is, angles of 0, 45, 90, 135, 180, 225, 270 and 315 degrees (e.g.: a vector having an angle of 70 degrees is quantized as a vector having an angle of 90 degrees which is the closest quantized vector).

A lens distortion center is disposed in a region indicated by the directions of center point vectors. Thus, a region indicated by each center point vector is expressed as a quadrilateral, and a region in which the largest number of quadrilaterals overlap may be a candidate region including a lens distortion center.

For example, a region indicated by a first center point vector is a first region (500), a region indicated by a second center point vector is a second region (510), and a region indicated by a third center point vector is a third region (520). A fourth region (530) in which the first, second and third regions (500), (510) and (520) overlap may be a candidate region including a lens distortion center.

In an example embodiment of the present invention, the number of directions of quantized center point vectors is merely one example provided for convenience, and a quantization level may vary.

Without departing from the spirit of the present invention, a region including a lens distortion center may be found in another way. For example, a region indicated by the largest number of center point vectors among quantized center point vectors may be selected and used as a region including a lens distortion center.

After a region including a lens distortion center is found, the lens distortion center may be estimated. A variety of methods may be used to estimate the lens distortion center.

For example, to reduce the amount of calculation, the center point of a lens distortion center region may be estimated and used as a lens distortion center. Another method of dividing the region into quarters in order to improve the accuracy of a lens distortion center, checking errors after distortion is corrected using the center points of the respective divided regions to select one center point, and dividing a region including the selected center point into quarters again is repeatedly performed until the size of the region including the selected center point becomes small enough, so that the lens distortion center can be estimated.

In example embodiments of the present invention, a method of estimating a lens distortion center is not limited to one type, and a variety of methods can be used without departing from the spirit of the present invention.

Figure 6:
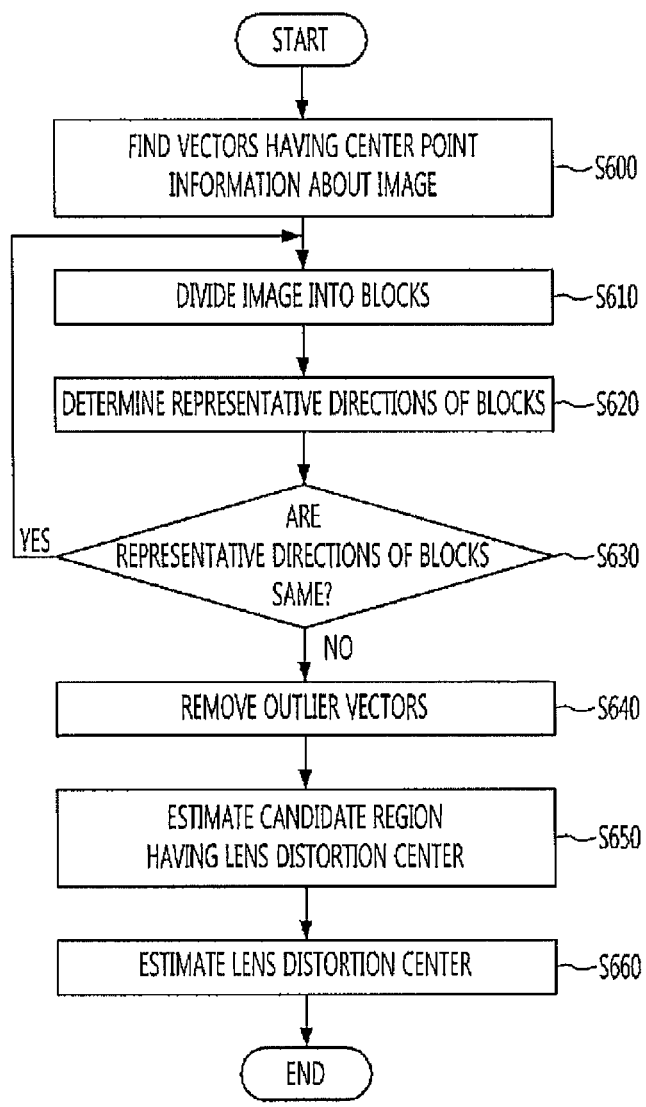
FIG. 6 is a flowchart illustrating a method of estimating a lens distortion center according to an example embodiment of the present invention.

FIG. 6 is a flowchart illustrating a method of estimating a lens distortion center according to an example embodiment of the present invention.

Referring to FIG. 6, vectors having information about the center point of an image may be found (S600).

A vector having a value greater than a predetermined threshold value may be selectively used as a center point vector.

Such a threshold value may be adjusted to reduce the complexity of calculation, so that only a specific center point vector can be used as a center point vector.

As shown in FIG. 3, the vector having the center point information about the image has a center point of a curve as a start point and a point at which a line extending from the center point of the curve crosses a chord at right angles as an end point. In this way, center point vectors may be extracted from all curves included in the image.

A center point vector is an example for indicating a distortion center of a lens for convenience, and forms of expression other than a vector can also be used to indicate a lens distortion center.

Various methods may be used to detect curves included in an image, and the curve detection method is not limited to a specific method in an example embodiment of the present invention.

For example, an edge of an image may be detected, and then pixels constituting the edge may be connected to detect lines. When the detected lines are connected, curves are formed. Here, using some threshold values of the length, angle, and distance of a curve, a curve for estimating a lens distortion center of the image may be generated. Curves may also be detected using a Hough transform, etc. rather than this method.

After a curve is detected using such methods, a straight line for detecting a center point vector of the curve may be generated.

For example, when the sum of squares of vertical distance from all pixels in the curve to each straight line is calculated using a regression line, a straight line having the least sum may be found, and the found straight line may be estimated to be similar to a line before occurrence of distortion and used.

However, without departing from the spirit of the present invention, a straight line for finding a center point vector for detecting a lens distortion center may be found in a different method than the above-described method, and the different method is also covered by the claims of the present invention.

The image may be divided into blocks (S610).

Among center point vectors in the image, center point vectors having a magnitude greater than a specific threshold value may be differentiated and counted on the basis of a horizontal axis of the image. The whole image may be divided into two blocks, and center point vectors included in each block may be grouped. Here, the two divided blocks may include the same number of center point vector start points or end points. In the divided blocks, the same number of center point vector start points or end points may be included. When the number of center point vectors is odd, the number of center point vectors in one of the two blocks may be greater than that in the other block by one.

The representative directions of the blocks may be determined (S620).

In the case of a horizontal axis, center point vectors directed to the left and those directed to the right among vectors belonging to each of the two divided blocks may be differentiated and counted, and a direction indicated by a greater number of center point vectors may be determined as a representative direction of the block.

In the case of a vertical axis, center point vectors directed to the top and those directed to the bottom among vectors belonging to each of the divided two blocks may be differentiated and counted, and a direction indicated by a greater number of center point vectors may be determined as a representative direction of the block.

It may be determined whether or not the representative directions of the blocks coincide (S630).

When the representative directions of the blocks coincide, the process proceeds back to S610, and a process of dividing a block disposed in the representative direction into smaller blocks may be performed.

When the representative directions of the blocks do not coincide, rather than a process of dividing a region into blocks, a process of removing outlier vectors not indicating the representative direction of each block may be performed (S640).

In the example embodiment of the present invention, an image is divided into blocks on the basis of, for convenience, a horizontal axis. However, S610 to S640 performed on the basis of the horizontal axis may be performed on the basis of a vertical axis in the same way, so that the process of removing outlier vectors can be performed.

Using inlier vectors left after outlier vectors are removed, a candidate region having a lens distortion center may be estimated (S650).

A method of detecting a candidate region including a lens distortion center may be repeatedly performed with the size of the candidate region continuously reduced, so that the complexity of calculation can be reduced to be lower than that of a method of detecting a lens distortion center in all coordinates in the candidate region.

Using the method of detecting a candidate region, the complexity of calculation for detecting a lens distortion center can be reduced.

On the basis of the detected candidate region having a lens distortion center, the lens distortion center may be estimated (S660).

After a region including a lens distortion center is detected, the lens distortion center may be estimated. A variety of methods may be used to estimate the lens distortion center.

For example, to reduce the amount of calculation, the center point of the lens distortion center region may be estimated and used as a lens distortion center. Another method of dividing the region into quarters in order to improve the accuracy of a lens distortion center, checking errors after distortion is corrected using the center points of the respective divided regions to select one center point, and dividing a region including the selected center point into quarters again may be repeatedly performed until the size of the region including the selected center point becomes small enough, so that the lens distortion center can be estimated.

In example embodiments of the present invention, a method of estimating a lens distortion center is not limited to one type, and a variety of methods can be used without departing from the spirit of the present invention.

Using Equations 1 to 3 on the basis of the estimated lens distortion center, distortion that has occurred in the image can be accurately corrected.

Figure 7:
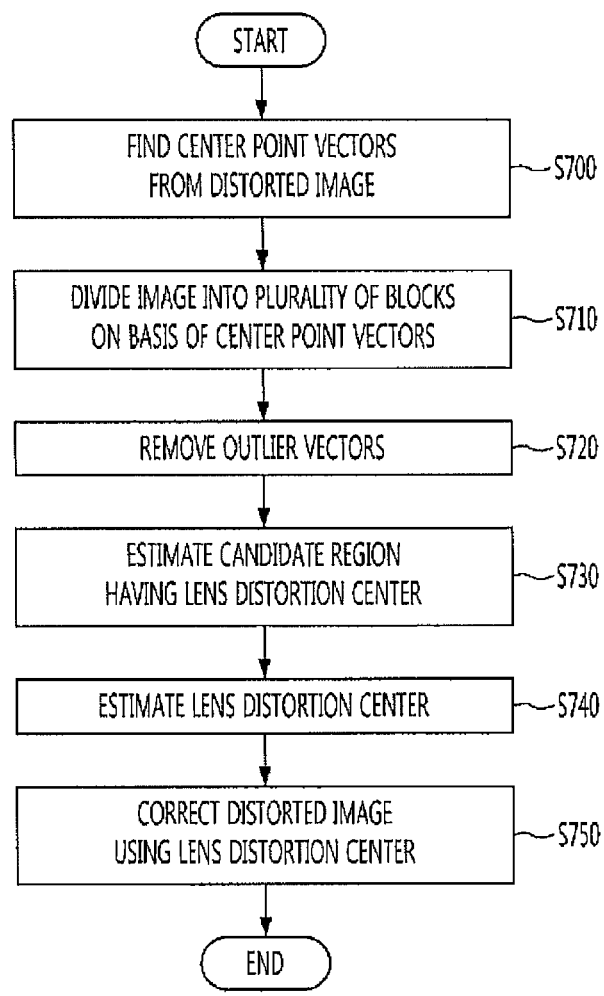
FIG. 7 is a flowchart illustrating a method of correcting a distorted image according to an example embodiment of the present invention.

FIG. 7 is a flowchart illustrating a method of correcting a distorted image according to an example embodiment of the present invention.

Referring to FIG. 7, center point vectors may be obtained from a distorted image (S700).

The center point vectors may be obtained in the way described in S600 of FIG. 6.

On the basis of the center point vectors, the image may be divided into a plurality of blocks (S710).

The number of cases in which the image can be divided may be calculated on the basis of the number of all the center point vectors, and the image may be divided according to the corresponding case.

For example, when the number of all the center point vectors is 30, the image may be divided, such as 15/15, 15/7/8, 15/7/4/4, and 15/7/4/2/2, on the basis of the number of cases in which the image can be divided.

When there is a block having a representative direction different from other blocks among blocks divided from a specific image, how the image has been divided may be determined as an image division method for finding a lens distortion center.

On the basis of the representative directions of the divided blocks, outlier vectors may be removed (S720).

In the step of removing outlier vectors, vectors not indicating the representative direction of each block may be removed, and the accuracy of lens distortion center estimation may be improved.

A candidate region having a lens distortion center may be estimated (S730).

The candidate region having a lens distortion center may be estimated in the same way as described in S650 of FIG. 6.

A lens distortion center may be estimated on the basis of the candidate region (S740).

The lens distortion center may be estimated in the same way as described in S660 of FIG. 6.

The distorted image may be corrected on the basis of the estimated lens distortion center (S750).

To correct the distorted image on the basis of the lens distortion center, Equations 1 to 3 may be used.

The distorted image may be corrected into an actual image using Equation 3 to reduce the complexity of calculation simply on the basis of the lens distortion center, or may be corrected using Equation 1.

Figure 8:
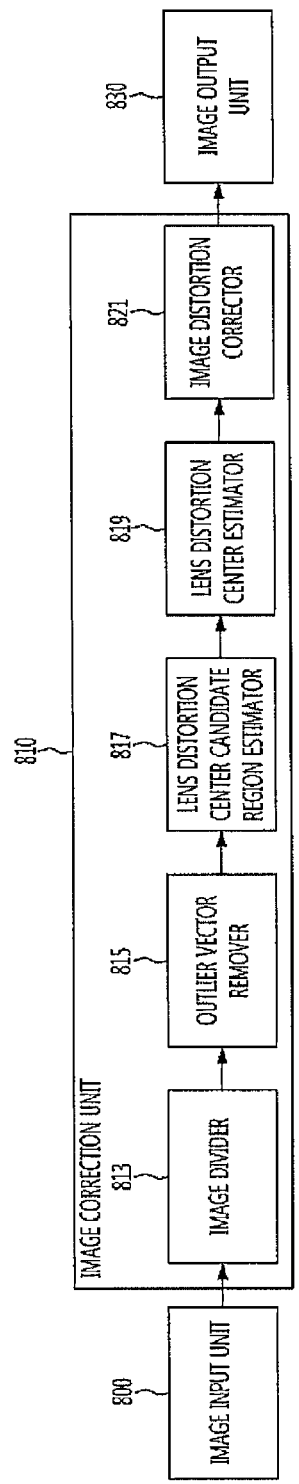
FIG. 8 is a block diagram of an apparatus for correcting a distorted image according to an example embodiment of the present invention.

FIG. 8 is a block diagram of an apparatus for correcting a distorted image according to an example embodiment of the present invention.

Referring to FIG. 8, an apparatus for correcting a distorted image may include an image input unit (800), an image correction unit (810), and an image output unit (830).

The image correction unit (810) may include an image divider (813), an outlier vector remover (815), a lens distortion center candidate region estimator (817), a lens distortion center estimator (819), and an image distortion corrector (821).

The respective components are separately mentioned for convenience. To perform a function, at least two of the components may be combined into one component, or one component may be divided into a plurality of components. Example embodiments in which the respective components are combined and divided without departing from the spirit of the present invention are also covered by the claims of the present invention.

Also, some components may not be essential components to perform a fundamental function in the present invention but selective components for merely improving performance. An example embodiment of the present invention may include only the essential components to implement the spirit of the present invention, excluding the components merely used to improve performance, and a structure including the essential components, excluding the selective components merely used to improve performance, is also included in the claims of the present invention.

A distorted image for correction may be input to the image input unit (800).

The image correction unit (810) may include the image divider (813), the outlier vector remover (815), the lens distortion center candidate region estimator (817), the lens distortion center estimator (819), and the image distortion corrector (821).

The image divider (813) may divide the image on the basis of the number of center point vectors to find a lens distortion center of the distorted image.

The image divider (813) may find center point vectors including information about a lens distortion center of the image, and divide the image into at least two blocks on the basis of the center point vectors. Also, the image divider (813) may determine the representative directions of the at least two divided blocks.

When the representative directions of blocks of the divided image are determined on the basis of the center point vectors, one of divided blocks may have a different representative direction than other divided blocks. In this case, division of the image may be stopped.

The outlier vector remover (815) may remove outlier vectors not indicating the representative direction of each divided block.

The lens distortion center candidate region estimator (817) may estimate a candidate region in which a lens distortion center may be disposed on the basis of inlier vectors left in the image from which outlier vectors are removed.

In an example embodiment of the present invention, a lens distortion center candidate region may be estimated using a method of determining a region in which the largest number of regions indicated by the center point vectors overlap as a lens distortion center candidate region.

The lens distortion center estimator (817) may estimate a lens distortion center included in the estimated lens distortion center candidate region.

In an example embodiment of the present invention, to reduce the amount of calculation, the center point of the lens distortion center region may be estimated and used as a lens distortion center. Another method of dividing the region into quarters in order to improve the accuracy of a lens distortion center, checking errors after distortion is corrected using the center points of the respective divided regions to select one center point, and dividing a region including the selected center point into quarters again is repeatedly performed until the size of the region including the selected center point becomes small enough, so that the lens distortion center can be estimated.

The image distortion corrector (821) may correct distortion that has occurred in the image on the basis of the lens distortion center estimated by the lens distortion center estimator (819).

In an example embodiment of the present invention, a distorted image may be corrected using Equations 1 to 3 or an obtained lens distortion center without departing from the spirit of the present invention.

The image output unit (830) may output the image corrected by the image distortion corrector (821).

Figure 9:
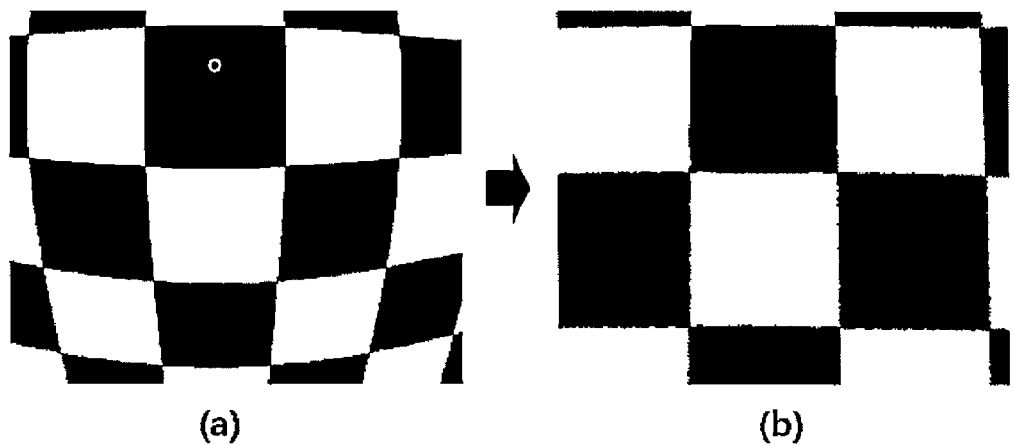
FIG. 9 shows images before and after distortion of an image is corrected using a lens distortion center estimation method according to an example embodiment of the present invention.

FIG. 9 shows images before and after distortion in an image is corrected using a lens distortion center estimation method according to an example embodiment of the present invention.

FIG. 9(A) shows a distorted image, and FIG. 9(B) shows an image obtained by correcting the distorted image using a lens distortion center estimation method.

As a result of correcting distortion that has occurred in a chessboard image consisting of straight lines, that is, the original image, using a lens distortion center according to an example embodiment of the present invention, the distorted image may be changed into the original chessboard image consisting of straight lines.

Figure 10:
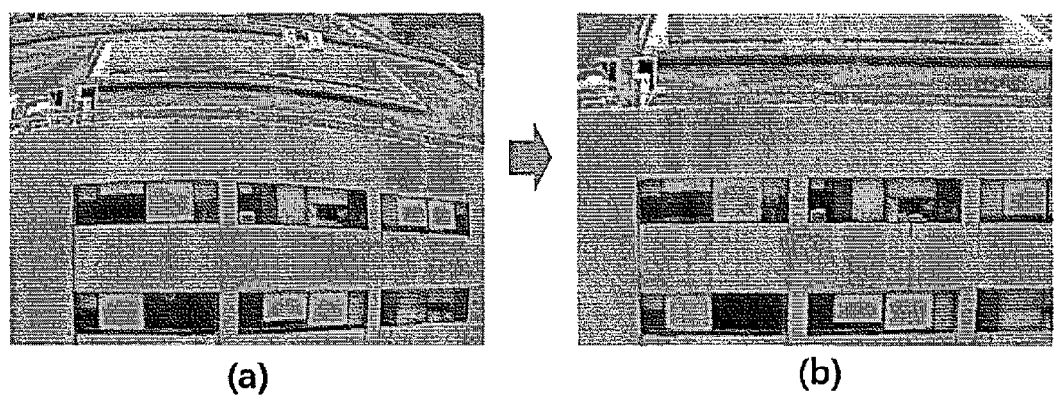
FIG. 10 shows images before and after distortion of an image is corrected using a lens distortion center estimation method according to an example embodiment of the present invention.

FIG. 10 shows images before and after distortion in an image is corrected using a lens distortion center estimation method according to an example embodiment of the present invention.

FIG. 10(A) shows a distorted image, and FIG. 10(B) shows an image obtained by correcting the distorted image using a lens distortion center estimation method.

An image consisting of curves resulting from distortion of the original image of a building consisting of straight lines is corrected to obtain the original image of the building consisting of straight lines.

A method of correcting distortion of an image according to an example embodiment of the present invention can effectively estimate a lens distortion center using only an image in which lens distortion has occurred without additional information for correcting the distortion.

Example embodiments of the present invention can be used in small cameras whose lenses cannot be changed, other image photographing apparatuses, and also software for correcting images such as Photoshop.

A method of correcting distortion of an image according to an example embodiment of the present invention can be effectively used in small cameras for which it is difficult to use a special material or a technique of attaching several lenses, and whose lenses cannot be changed.

The above-described apparatus and method for correcting distortion of an image according to example embodiments of the present invention can estimate the center of lens distortion in an image in which the lens distortion has occurred, detect lines that are not distorted on the basis of the lens distortion center, and find the lens distortion center using lines capable of improving the accuracy of lens distortion center estimation rather than the undistorted lines.

Accordingly, accurate image correction is enabled by estimating distortion centers of images generated by devices equipped with any lens. Also, image content improving lens distortion correction performance is differentiated from image content degrading the same by picking out image content improving lens distortion center estimation performance, so that a superior image correction effect to other image correction techniques can be obtained.

While the example embodiments of the present invention and their advantages have been described in detail, it should be understood that various changes, substitutions and alterations may be made herein without departing from the scope of the invention.

What is claimed is:

1. A method of correcting distortion of an image, comprising:
   finding center point vectors including lens distortion center information about the image, and dividing the image into at least two blocks on the basis of the center point vectors; and
   determining representative directions of the at least two divided blocks and removing outlier vectors not indicating the representative directions from the blocks to estimate a lens distortion center.

2. The method of claim 1, wherein finding the center point vectors and dividing the image into the at least two blocks on the basis of the center point vectors includes:

extracting the center point vectors having points included in arcs of curves included in the image as start points of the center point vectors and points included in chords of the curves as end points of the center point vectors; and dividing the image so that numbers of center point vectors in the respective blocks become the same or have a difference of 1.

3. The method of claim 2, wherein extracting the center point vectors having the points included in the arcs of the curves included in the image as the start points of the center point vectors and the points included in the chords of the curves as the end points of the center point vectors includes determining center points of the arcs as the start points of the center point vectors and points at which lines extending from the center points of the arcs cross the chords of the curves at right angles as the end points of the center point vectors.

4. The method of claim 1, wherein finding the center point vectors and dividing the image into the at least two blocks on the basis of the center point vectors includes stopping division of the image when one of the blocks obtained by dividing the image has a different representative direction than the other blocks.

5. The method of claim 1, wherein determining the representative directions of the at least two divided blocks and removing the outlier vectors not indicating the representative directions from the blocks to estimate the lens distortion center includes:

detecting a candidate region having the lens distortion center; and estimating the lens distortion center on the basis of the candidate region having the lens distortion center.

6. The method of claim 5, wherein detecting the candidate region having the lens distortion center includes quantizing the center point vectors except for the outlier vectors, and detecting a region in which a largest number of regions indicated by the quantized center point vectors overlap as the candidate region having the lens distortion center.

7. The method of claim 5, wherein estimating the lens distortion center on the basis of the candidate region having the lens distortion center includes dividing the candidate region into quarters, selecting one region among divided the candidate region using the center points of the respective divided the candidate region by checking errors after distortion is corrected, and estimating the lens distortion center by performing to divide the one region into quarters until a size of divided the one region becomes predetermined size.

8. An apparatus for correcting distortion of an image, comprising:

an image input unit to which the image is input; and an image correction unit configured to receive the image input from the image input unit, find center point vectors including lens distortion center information about the image, divide the image into at least two blocks on the basis of the center point vectors, determine representative directions of the at least two divided blocks, and remove outlier vectors not indicating the representative directions from the blocks to estimate a lens distortion center.

9. The apparatus of claim 8, wherein the image correction unit includes:

an image divider configured to find the center point vectors on the basis of the image provided by the image input unit, and divide the image on the basis of the center point vectors;

an outlier vector remover configured to remove the outlier vectors not indicating the representative directions based on the center point vectors of the divided image provided by the image divider;

a lens distortion center candidate region estimator configured to detect a lens distortion center candidate region on the basis of center point vectors included in the blocks provided by the outlier vector remover; and a lens distortion center estimator configured to estimate the lens distortion center included in the lens distortion center candidate region provided by the lens distortion center candidate region estimator.

10. The apparatus of claim 9, wherein the image divider extracts the center point vectors having points included in arcs of curves included in the image as start points of the center point vectors and points included in chords of the curves as end points of the center point vectors, and divides the image so that numbers of center point vectors in the respective blocks become the same or have a difference of 1.

11. The apparatus of claim 10, wherein the image divider determines center points of the arcs as the start points of the center point vectors and points at which lines extending from the center points of the arcs cross the chords of the curves at right angles as the end points of the center point vectors.

12. The apparatus of claim 9, wherein the lens distortion center candidate region estimator quantizes the center point vectors except for the outlier vectors, and estimates a region in which a largest number of regions indicated by the quantized center point vectors overlap as the candidate region having the lens distortion center.

13. The apparatus of claim 9, wherein the lens distortion center estimator estimates a center of the candidate region having the lens distortion center as the lens distortion center.

* * * * *